United States Patent [19]

Fridman et al.

[11] 4,119,572
[45] Oct. 10, 1978

[54] CARBON-GRAPHITE MATERIAL FOR BRUSHES OF ELECTRIC MACHINES AND METHOD FOR PREPARING SAME

[76] Inventors: Georgy Nikolaevich Fridman, Leninsky prospekt, 67, kv. 40; Jury Nikolaevich Vasiliev, ulitsa Vostrukhina, 6, korpus 3, kv. 67; Abram Samoilovich Fialkov, Kutuzovsky prospekt, 9, kv. 95; Vladimir Petrovich Sosedov, 1 Vladimirskaya ulitsa, 24, korpus 2, kv. 26; Alexandr Andreevich Tarasov, ulitsa Schepkina, 47, kv. 6; Yakov Gilievich Davidovich, Molodezhnaya ulitsa, 3, kv. 333; Nikolai Sergeevich Voronin, Gruzinsky val, 18/15, kv. 98; Alexei Gavrilovich Shirokov, Teply stan, 1 mikroraion A, korpus 15, kv. 92; Alexandr Iudovich Sokolovsky, ulitsa Salyam Adilya, 9, korpus 1, kv. 58, all of Moscow; Anatoly Alexandrovich Kozyrev, Sovetskaya ulitsa, 24, kv. 5, Elektrogorsk Moskovskoi oblasti; Roza Petrovna Berlizova, 1 Vladimirskaya ulitsa, 22, korpus 2, kv. 16; Evgeny Mikhailovich Kozlov, Armyansky pereulok, 9, kv. 59, both of Moscow; Anatoly Alexeevich Boiko, Komsomolskaya ulitsa, 7, kv. 38, Elektrougli Moskovskoi oblasti; Andrei Nikolaevich Gusev, Malakhitovaya ulitsa, 14, kv. 79, Moscow; Olga Borisovna Kazakova, ulitsa Sovetskaya 5, kv. 25, Elektrougli Moskovskoi oblasti; Valery Alexeevich Fugol, Savinskaya naberezhnaya, 19, kv. 64, Moscow; Nadezhda Vasilievna Kalinina, Ketcherskaya ulitsa, 8, korpus 1, kv. 42, Moscow; Valentina Mikhailovna Emelyanova, 13 Parkovaya ulitsa, 20, korpus 3, kv. 62, Moscow, all of U.S.S.R.; Abram Yakovlevich Gluskin, deceased, late of Moscow, U.S.S.R., by Boris Abramovich Gluskin, administrator, Posledny pereulok, 8, kv. 4, Moscow, U.S.S.R.

[21] Appl. No.: 770,771

[22] Filed: Feb. 22, 1977

Related U.S. Application Data

[63] Continuation of Ser. No. 628,562, Nov. 4, 1975, abandoned.

[51] Int. Cl.$^2$ .................. H01B 1/06; H01R 39/26
[52] U.S. Cl. ..................... 252/506; 252/508; 252/509; 252/511; 427/113; 427/114; 427/380; 427/385 R; 427/407 R; 428/408
[58] Field of Search ............ 252/511, 508, 509, 506; 428/408; 427/113, 114, 380, 385 R, 407 R

[56] References Cited
U.S. PATENT DOCUMENTS

| | | | |
|---|---|---|---|
| 2,685,539 | 8/1954 | Woodburn et al. | 428/408 |
| 2,685,540 | 8/1954 | Woodburn et al. | 428/408 |
| 2,685,541 | 8/1954 | Woodburn et al. | 428/408 |
| 2,909,452 | 10/1959 | Parriss et al. | 428/408 |
| 3,342,627 | 9/1967 | Paxton et al. | 428/408 |
| 3,713,882 | 1/1973 | DeBrunner et al. | 428/408 |
| 3,996,408 | 12/1976 | Fridman et al. | 428/408 |

OTHER PUBLICATIONS

Noller, Chemistry of Organic Compounds, 3rd Edition, 1965, p. 603.
The Condensed Chemical Dictionary, Sixth Edition, pub. 1961, Reinhold Pub. Co., New York, p. 545.

*Primary Examiner*—Herbert B. Guynn
*Attorney, Agent, or Firm*—Holman & Stern

[57] ABSTRACT

A carbon graphite material for brushes of electric machines contains ultraphosphates of metals which are sealed by film-forming polymers. The material is impregnated in a mixture of a metal chloride with an aqueous solution of orthophosphoric acid and heat treated to form ultraphosphates of metals evenly distributed throughout the entire volume of the material. The material is then impregnated in a film-forming polymer resin solution, which enhances the contact characteristics of the material, and again heat treated till the resin is fully polymerized. As a result, the ultraphosphates which have formed earlier in the material, are sealed, thus becoming hydrolytically stable; at the same time, the contact characteristics of the material improve generally, the material becoming highly wear resistant, capable of operating within a wide range of temperatures, pressures and humidity.

2 Claims, 1 Drawing Figure

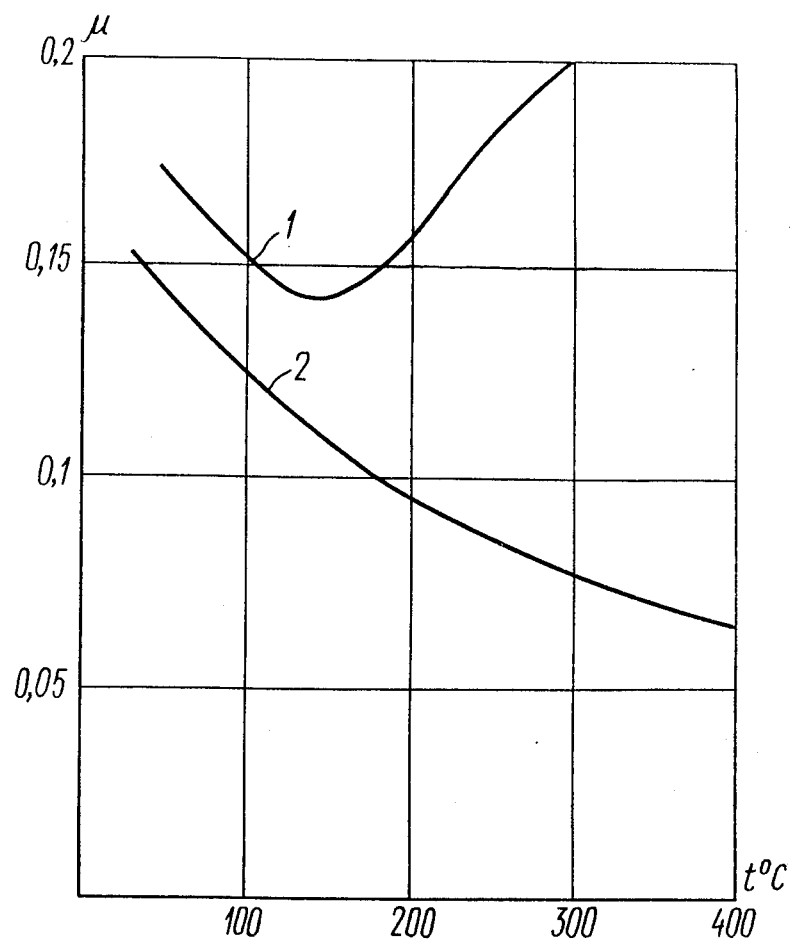

CARBON-GRAPHITE MATERIAL FOR BRUSHES OF ELECTRIC MACHINES AND METHOD FOR PREPARING SAME

This is a continuation of application Ser. No. 628,562, filed Nov. 4, 1975, now abandoned.

BACKGROUND OF THE INVENTION

The present invention relates to heavy-current electrical engineering and, more particularly, to a carbon-graphite material for brushes of electric machines.

Improving the reliability and, at the same time, reducing the specific gravity of active electrotechnical materials, particularly by increasing rotation speeds along with increasing working temperatures of the windings, is one of the current trends in perfecting electric machines. In the case of commutator machines, serious difficulties are encountered, especially providing for sufficiently reliable commutation and wear resistance of the sliding contact pair of the machines.

Enhancing the performance of a brush contact operating at a temperature higher than 150° C., the point at which adsorption of water vapors from the ambient atmosphere by the rubbing contact surfaces becomes minimum, is quite a big problem.

Improving the properties of a carbon-graphite material through impregnation thereof in various impregnating compounds is one of the ways to eliminate the above difficulties.

A great number of formulations for impregnating compounds have been disclosed in patents issued in many countries and, in particular, known in the art are compounds based on drying vegetable oils, various resins and other organic and inorganic chemicals.

For example, such patents have been granted for applications of the Federal Republic of Germany (Nos. 1,091,218 and 1,241,903), France (No. 1,005,261), the USA (Nos. 2,989,490 and 2,425,046 etc.). However, more thorough analysis and studies conducted in the USSR have shown that the known formulations for impregnating compounds and their additives, increase the durability of electric brushes without taking into account special operating conditions by 2-3 times on the average and are suitable for operation at a working temperature ranging from 200° to 250° C.

The nearest analogue to the subject of the present invention is British Pat. No. 823,964 which discloses a carbon-graphite brush material containing sodium pyrophosphate and a solidified mixture of unsaturated resins (polyesters).

The brushes described in the British patent are intended for operation under heavy conditions and at high altitude.

However, this material fails to provide for satisfactory operation of brushes within a wide range of temperatures, the reason being that sodium pyrophosphate, just as phosphates of light metals in general, disintegrate relatively fast.

SUMMARY OF THE INVENTION

It is an object of the present invention to provide a carbon-graphite material for brushes of electric machines and a method for preparing same, which material provides a substantial improvement in wear resistance of a commutator sliding contact pair operating within a wide range of temperatures, pressures and humidity, by way of impregnation of the porous carbon-graphite material in phosphates, preferably, phosphates of heavy metals, and in particular, ultraphosphates of zinc, manganese and other metals, followed by sealing of the phosphates with film-forming polymer compounds which enhance the contact characteristics of the carbon-graphite material and add hydrolytic stability to the ultraphosphates.

This object is achieved by a carbon-graphite material for brushes of electric machines containing phosphorus compounds evenly distributed throughout the entire volume thereof, and a sealing compound, the phosphorus compounds being, according to the invention, ultraphosphates of metals, the sealing compound being an organic film-forming polymer and mixtures thereof, whereby the contact characteristics of the carbon-graphite material are enhanced.

It is expedient that the method for preparing the carbon-graphite material consist in impregnation thereof in chlorides of metals mixed with an aqueous solution of orthophosphoric acid, whereafter the material is dried in air, then heat treated with a gradual rise in temperature to 500°–600° C. during a period of time, required to form ultraphosphates of the metals in the pores of the carbon-graphite material, the content of the ultraphosphates being from 0.1 to 15% by weight with respect to the initial weight of the material, after which the material is cooled and impregnated in a film-forming polymer resin solution, the solution sealing the ultraphosphates and enhancing the contact characteristics of brushes made from the material.

After impregnation with the resin solution, a second heat treatment of the material is carried out with a gradual rise in temperature to 180°–250° C. depending on the selected polymer compound till the compound is fully polymerized, the content of a dry residue being 0.5 to 10% by weight with respect to the weight of the carbon-graphite material after the first impregnation and heat treatment cycle.

Impregnation of the carbon-graphite material with the ultraphosphates of metals, as compared to other prior art compositions, results in a higher heat resistance, since ultraphosphates of all phosphorus compounds have the longest action as generators of phosphoric anhydride and phosphoric acid, which adsorb well on friction surfaces at working temperatures of 400° C. and above, thereby providing for normal operation of a sliding electric contact within a wide range of elevated working temperatures.

However, the ultraphosphates as such lack sufficient hydrolytic stability, and when put in a humid atmosphere (whether in operation or storage) they quickly disintegrate and subsequently become aggressive to metal parts of electric machines.

Also, the lowest point in the working temperature range for the ultraphosphates acting as generators of phosphoric anhydride is still rather high, which reduces the efficiency of brushes when they operate at relatively low working temperatures.

To protect the ultraphosphates from hydrolysis and expansion of the working temperature range the carbon-graphite material, which the ultraphosphates of metals, is impregnated with a sealing compound. The compound, including film-forming polymers and mixtures thereof, envelops the ultraphosphate particles as it is being further polymerized, sealing the ultraphosphates in the pores of the brush material. The composition the film-forming polymers is selected with a view to enhancing the contact characteristics of the brushes.

The brush dust of the brushes impregnated in the sealing compound has low adhesive properties with respect to the insulation surfaces of electric machine parts, thereby increasing the overall operating level of insulation resistance, which in turn results in improved operating reliability of commutator electric machines operating under arduous conditions.

Used as the phosphorus compounds may be ultraphosphates of zinc, manganese, magnesium, lithium, potassium, aluminium, iron, lead and other metals and mixtures thereof; used as the sealing compounds are mixtures of organic film-forming impregnating compounds including unsaturated fatty acids, drying vegetable oils and various organic resins, polyesters and alcohols, e.g. a mixture of cobalt linoleate with glyptal-melamine resin, epoxy resin, phenol formaldehyde and Bakelite resin, furyl alcohol, polyesters, polyamides and other organic film-forming compounds.

Those skilled in the art can see that the present invention is based on a combined effect produced by the use of ultraphosphates of metals with film-forming organic compounds sealing the ultraphosphates in the pores of the carbon-graphite material and enhancing the contact characteristics of same.

BRIEF DESCRIPTION OF THE DRAWING

For a better understanding of the present invention given below is an example of preparing a carbon-graphite material for brushes, which is merely illustrative and does not confine the scope of the invention. The description is made with reference to the accompanying drawing which shows the coefficient of friction ($\mu$) of the sliding contact versus temperature ($t°$ C.).

DETAILED DESCRIPTION OF THE PREFERRED EMBODIMENT

A carbon-graphite material prepared by any conventional method is cut into blanks of the size of finished brushes (but without fixtures and leads) and subjected to combined treatment.

First, the blanks are dehumidified at a temperature of 120°–130° C. for 1–2 hours, then they are placed into an autoclave which is evacuated to a pressure of 3–5 mm Hg.

Then, fed into the autoclave is an aqueous solution containing 0.4 mol of chloride of manganese, zinc, or any other metal or mixtures thereof with 0.6 mol of orthophosphoric acid in 1 l of water, with nitrogen or an inert gas being injected thereinto at a pressure of up to 5–10 atm. After the blanks are allowed to stay under pressure for 0.5–2 hours in the solution, they are withdrawn from the autoclave and dried in air at room temperature for about 3 days.

The blanks predried in air are then heat treated at a temperature gradually rising to 500°–600° C. till ultraphosphates of the metals form in the pores of the brush material. The blanks are heat treated in a coke charge in an oven with inert gas.

When impregnating the blanks in the autoclave, it is possible to use air instead of nitrogen.

In some cases, when only a small degree of impregnation is required or the brush material is very porous, impregnation can be effected by immersing the material into conventional baths in air.

Depending on the porosity of the material for the brushes and the required weight gain, the concentration of the solution may vary within a wide range.

The blanks, impregnated in one of the orthophosphoric acid based impregnating compounds and containing after respective heat treatment ultraphosphates of various metals in quantities of 0.1 to 15% by weight with respect to the initial weight of the blanks, are again dried at a temperature of 100°–120° C. till they are fully dehumidified, cooled down at 70°–80° C. and, while still warm, immersed into a bath with an impregnation compound which is a mixture of film-forming polymers.

One of the possible formulations of the secondary impregnating compound comprising a mixture of organic film-forming polymers intended to enhance the contact characteristics of the brush material, reduce the adhesiveness of the brush dust with respect to the insulation of electric machines and seal the ultraphosphates of metals, is as follows:

(1) 20% of the total weight of the compound being a mixture of glyptal resin with melamine in the ratio 5:1 dissolved in toluene to the required viscosity;

(2) 80% of the total weight of the compound being cobalt linoleate containing up to 15% cobalt oxide, dissolved in toluene.

The two components are poured together and intimately mixed at room temperature. The blanks are impregnated in the resulting mixture for 1–2 hours.

The impregnation may be carried out in an autoclave as well.

After the impregnation, the blanks are kept in air for 4–5 hours, then heat treated in an air oven with ventilation, and a gradual rise in temperature. Given below are approximate conditions for the heat treatment:

120° C. — 4 hours
150° C. — 4 hours
180° C. — 2 hours

Depending on the type and design of brushes, the weight of the dry residue of the impregnating polymer compound after the second heat treatment may vary from 0.5 to 10% with respect to the weight of the blanks after the first impregnation and heat treatment thereof, which is achieved by changing the working viscosity of the organic film-forming impregnating compound.

Considering that the phosphate-polymer impregnated brushes have to operate under conditions of high humidity, the impregnation of the carbon-graphite material in the polymer compound with subsequent heat treatment may be done twice.

Test Data

Table 1 contains comparative test data obtained as a result of testing a few conventional types of brushes operating at a temperature of up to 150° C. of the sliding contact.

Table 1

| Nos. | Types of Brushes | Wear Rate (mm/hr) ||||| Winding insulation resistance of machines (after) 500 hrs of operation |
|---|---|---|---|---|---|---|---|
| | | 100 | 200 | 300 | 400 | 500 | |
| 1. | Carbon-graphite material without impregnation | 1.9 | 3.6 | 5.5 | 7.8 | 9.6 | 1 |
| 2. | As in item 1, | | | | | | |

Table 1-continued

| Nos. | Types of Brushes | Wear Rate (mm/hr) | | | | | Winding insulation resistance of machines (after) 500 hrs of operation |
|---|---|---|---|---|---|---|---|
| | | 100 | 200 | 300 | 400 | 500 | |
| | containing sodium pyrophosphates and polyester resin | 0.39 | 0.65 | 1.17 | 1.69 | 2.24 | 0.6 |
| 3. | As in item 1, containing ultraphosphates of zinc and manganese | 0.15 | 0.38 | 0.61 | 0.95 | 1.35 | 1.6 |
| 4. | As in item 3, containing a mixture of cobalt linoleate with melamine-glyptal resin | 0.18 | 0.39 | 0.53 | 0.8 | 1.0 | 5 |

As can be seen from Table 1, the best and most stable result with a wear rate lower by one order of magnitude and a higher insulation resistance was obtained with brushes made of the herein proposed carbon-brush material.

Brushes containing only ultraphosphates of zinc and manganese, even operating under normal humidity conditions, displayed a tendency to a progressive increase in their wear rate, while brushes containing sodium pyrophosphates and polyester resin, even at an operating temperature of up to 150° C. manifested a reduction in the working insulation resistance of the electric machines as compared to the brushes proposed herein and other conventional types of brushes given above, due to the brush dust having high adhesiveness toward the end of a 500-hr operation cycle.

When tests were conducted on machines operating at sliding contact temperatures higher than 200° C. and in a medium of gaseous dry nitrogen, the wear resistance of the novel brushes increased by 1 to 2 orders of magnitude.

The appended drawing shows comparative friction characteristic curves (temperature dependence of coefficient of friction $\mu$) of carbon-graphite brushes operating after the treatment in accordance with the invention, wherein curve 1 is the characteristic before treatment and curve 2, after treatment, the material of the commutator being zirconium bronze.

As can be seen from the curves, the coefficient of friction of the brushes after composite treatment is substantially lower, especially at elevated temperatures.

What is claimed is:

1. A carbon-graphite material for brushes of electric machines impregnated with a mixture of manganese ultraphosphate and zinc ultraphosphate evenly distributed throughout the entire volume of the material in an amount of from 0.1 to 15% by weight and the ultraphosphates are sealed by a mixture of 80% by weight of cobalt linoleate containing up to 15% cobalt oxide and 20% by weight of glyptal resin with melamine in a ratio 5:1, the mixture being present in an amount of from 0.5 to 10% by weight, enhancing the contact characteristics of the carbon-graphite material.

2. A method for preparing a carbon-graphite material for brushes of electric machines comprising the steps of: impregnating a carbon-graphite material with an aqueous solution containing a mixture of manganese chloride and zinc chloride and orthophosphoric acid; drying the impregnated material in air; heat treating the impregnated material with a gradual rise in temperature to 500°-600° C. during a period of time required for forming manganese ultraphosphate and zinc ultraphosphate in the pores of the carbon-graphite material, the amount of the ultraphosphates being 0.1 to 15% by weight with respect to the initial weight of the material; cooling the ultraphosphate-containing material; impregnating the ultraphosphate-containing materal in a solution containing 80% by weight of cobalt linoleate containing up to 15% cobalt oxide and 20% by weight of glyptal resin with melamine in a ratio 5:1 with a view to sealing the ultraphosphates and enhancing the contact characteristics of the brushes; and heat treating the material impregnated with the resin solution with a gradual rise in temperature to 180°-250° C. until the resin is fully polymerized, the amount of the dry residue being 0.5 to 10% by weight with respect to the carbon-graphite material before impregnation in the resin solution.

* * * * *